United States Patent Office 2,939,764
Patented June 7, 1960

---

2,939,764

METHOD FOR REDUCING THE SILICA CONTENT OF ALUMINA-CONTAINING MATERIALS OF THE CLAY TYPE

Herbert Schoenfelder, Bonn, and Hans Ginsberg, Bad Godesberg, Germany, assignors to Vereinigte Aluminium-Werke, Aktiengesellschaft, Bonn, Germany Filed Mar. 7, 1958, Ser. No. 719,810

5 Claims. (Cl. 23—143)

This invention relates to a method of decomposing alumina containing substances having high silicic acid contents; it relates more particularly to a method of enriching the alumina content and decreasing the silica content of certain clays having an $SiO_2$ content higher than 40%.

This application is a continuation-in-part of pending application Serial No. 464,884, filed on October 26, 1954, and now abandoned.

In the decomposition of substances containing alumina, use is frequently made of the so-called "lime-soda" process, in which the silicic acid present in the starting material is intended to be converted by sintering with lime into calcium silicate, while the alumina is converted by soda ($Na_2CO_3$) into soluble aluminate which is subsequently recovered by leaching out the sintered product and processing the resulting solution to obtain alumina hydrate ($Al_2O_3.H_2O$, $Al_2O_3.2H_2O$, $Al_2O_3.3H_2O$). However, in this known process as well as in the Bayer process, a high silicic acid content in the starting materials must be avoided, since, otherwise, there is danger that a part of the alkali (Na,K ions) will be lost for the formation of alkali metal aluminate, and be instead used up for the formation of alkali metal silicates.

A great number of methods have been proposed in the art for reducing the silicic acid content of the starting materials prior to using them as a first step of preparing suitable starting materials in the above-mentioned processes for the decomposition of alumina containing materials. These methods frequently employ a preliminary treatment of the starting materials by heat treatment at elevated temperatures, and subsequent leaching with caustic soda (sodium hydroxide) solutions or soda (sodium carbonate) solutions.

Neither of these known methods is applicable to clays having a silicic acid content higher than 40%. Thus, certain clays of preferably much lower silica content, have been heated to temperatures between 400° and 700° C. and have then been extracted with boiling concentrated solutions of alkali metal hydroxides, which treatment results in a preferential extraction of the silica, leaving a residue richer in alumina and poorer in silica than the original material.

However, in the case of a large group of clay materials, such as kaolins as well as pyrophyllites and certain montmorillonites, all of which materials have an $SiO_2$ content above 40%, heating to temperatures between 400° and 700° does not have any marked effect on the solubility of the silicic acid contained in these materials. $SiO_2$ is present in these materials in compounds which are difficultly soluble or completely insoluble in alkali solutions (sodium hydroxide or carbonate). Heat treatment below 800° C. converts only about 5 to 7.5% of this silica content into a soluble form.

Furthermore, about 2 to 4% of the alumina contained in the heated material are made soluble, so that the ratio of soluble $SiO_2$ to soluble $Al_2O_3$ in the material treated at temperatures below 800° C. is about 2:1, which is unduly high in view of the fact that it is desired to dissolve a maximum amount of silicic acid, but restrict the dissolution of alumina to a minimum or, preferably, suppress the same completely.

When speaking of silica or silicic acid or $SiO_2$ content, this is to be understood as meaning that silicon is present bonded to oxygen in these materials in an amount which, in conventional quantitative chemical analysis, would be calculated as percent of $SiO_2$.

Due to rather involved chemical reactions constituting a thermic cleavage and recrystallization of the treated materials, calcination of the same at temperatures above 800° C. and up to 1100° C. leads to the conversion of much higher proportions of the total $SiO_2$ content into soluble form.

When calcining alumina containing materials of various $SiO_2$ contents at higher temperatures (800–1100° C.) the ratio of soluble silica to soluble alumina is greatly improved, i.e. a considerably higher rate of increase in silicic acid solubility is accompanied by a considerably lower rate of increase in the solubility of alumina.

Now, in the case of clays of different $SiO_2$ contents, experiments have been made in the past to find out, whether calcination and subsequent treatment with caustic soda (NaOH) solutions of low concentrations would permit removal of the silicic acid from the clays in sufficient proportions to obtain suitable starting materials for the lime-soda or the Bayer process.

It was found by these earlier experiments that calcination of the clays at temperatures about 1000° C. followed by an extraction treatment with caustic soda solutions having a concentration of about 10% NaOH permits the removal of substantial amounts of silicic acid from the clays, but at the best it was possible thereby to obtain an alumina-enriched product in which the molar ratio of $SiO_2:Al_2O_3$ was 1:1, which corresponds to the composition of sillimanite. Such enriched materials have an alumina content of 45 to 52%, but also still contain 30 to 25%, respectively, of $SiO_2$. When a more highly concentrated sodium hydroxide solution was used, it was found that the solubility of alumina in the caustic soda increased more rapidly, while the solubility rate of increase of silica appeared to be reduced.

Thus, when using sodium hydroxide solutions containing 15% NaOH, and comparing the extraction results with those of solutions containing 5 and 7.5 and 10% NaOH, it was found that the proportion of the total $SiO_2$ content that is soluble did indeed increase from about 45% to about 69%, but also that the solubility of $Al_2O_3$ increased from about 1.5–2% (with solutions of 5 and 7.5% of NaOH) to about 7.5% of the total $Al_2O_3$ content of the extracted material, i.e., while the soluble content of $SiO_2$ was not even doubled, the content of soluble alumina increased about four to five times.

These discouraging results led to the belief among those skilled in the art that increases in the NaOH concentration of extraction lyes for calcined clays would lead to losses of alumina in the order of 15% and higher. Consequently the marked attack on the alumina in the product was considered so prejudicial to the economy of the process that the above sillimanite type product was considered the optimal one that could be attained, if clays, and in particular clays having a higher $SiO_2$ content than 40%, were to be used as starting materials.

It is, therefore, an object of our invention to provide a method for the production of alumina enriched materials to be used as starting materials for decomposition processes of the above-mentioned types leading to the production of alumina hydrates, which method permits an increase in the alumina content of clays having an $SiO_2$ content above 40% so as to obtain an enriched product containing about 65% and more of $Al_2O_3$ and an $SiO_2$ content which has been reduced below 25% and is preferably in the order of 20% or less.

This object is attained by the method according to the invention which is based on our discovery that, contrary to the hitherto held beliefs, the solubility rate of alumina does not further increase but remains stationary or even slightly decreases when extraction of the clays having a high silicic acid (about 40%) which have been pre-calcined at 900° C. to 1100° C. and preferably at 1000° C., is carried out with sodium hydroxide solutions having an NaOH content above 20% and at a temperature between about 70° C., and the boiling temperature of the NaOH solutions preferably at about 100° C., and for a relatively short time of 15 to 30 minutes. We further found that the proportion of the silicic acid content of the clays, that can be removed with such sodium hydroxide solutions of higher concentration has a maximum range when the solutions have a NaOH content between 20 and about 35 to 40%.

The nature of our discovery and the method according to the invention shall be illustrated hereinafter with the aid of a number of graphs and flowsheets contained in the accompanying drawings, in which Figure 1 is a graph illustrating the proportions of silica and alumina contents of clays having an $SiO_2$ content above 40%, dependent upon the calcination temperature applied.

The method according to the invention shall now be described in detail with the aid of the flow-sheet of Figure 4.

Suitable starting materials for the process according to the invention are clays having a $SiO_2$ content higher than 40%, comprising minerals of the kaolin group having the basic formula

$Al_2O_3.2SiO_2.2H_2O$ such as nakrite, dickite and fire-clay, and other halloysites of the general formula

$Al_2O_3.2SiO_2.nH_2O$ furthermore minerals of the pyrophyllite group having the general formula

$Al_2O_3.4SiO_2.H_2O$ and clay constituents such as montmorillonite having the formula

$(Mg,Ca)O.Al_2O_3.4SiO_2.nH_2O$

All these materials shall be comprised hereinafter under the term "clays," and have usually an $SiO_2$ content between 45 and 55%.

Figure 4:
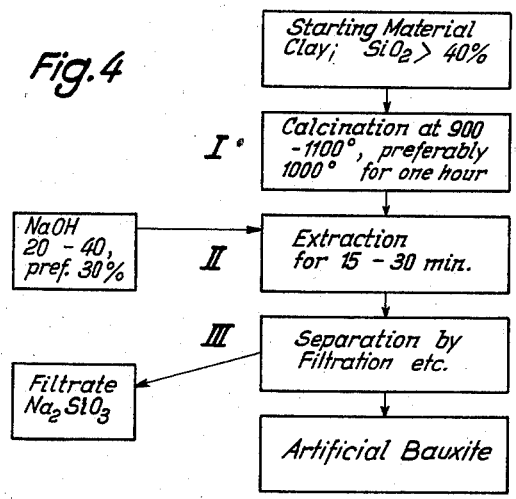
Figure 4 is a flowsheet illustrating the steps of carrying out the method according to the invention.

One of these starting materials or a mixture of several of them is first treated, according to Step I, as illustrated in the flowsheet of Figure 4, by calcination in a conventional furnace at temperatures between 900 and 1100° C., and preferably at about 1000° C.

We have found it to be of advantage to restrict the calcination step to about one hour. We have found that calcination at about 1000° C. for about one hour is sufficient to achieve a complete thermic cleavage and recrystallizations in the treated material so as to achieve the maximum attainable rate of conversion from difficultly soluble or insoluble silicic acid contained in the clays to a type of $SiO_2$ compounds which are easily soluble in the alkaline extraction agent according to the invention.

In this case, it is possible to convert about 80% of the total $SiO_2$ content to the soluble form, while only about 8% of the $Al_2O_3$ present in the clays, becomes soluble, i.e. the ratio between the soluble shares of

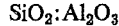

$SiO_2:Al_2O_3$ is 10.1.

Figure 1:
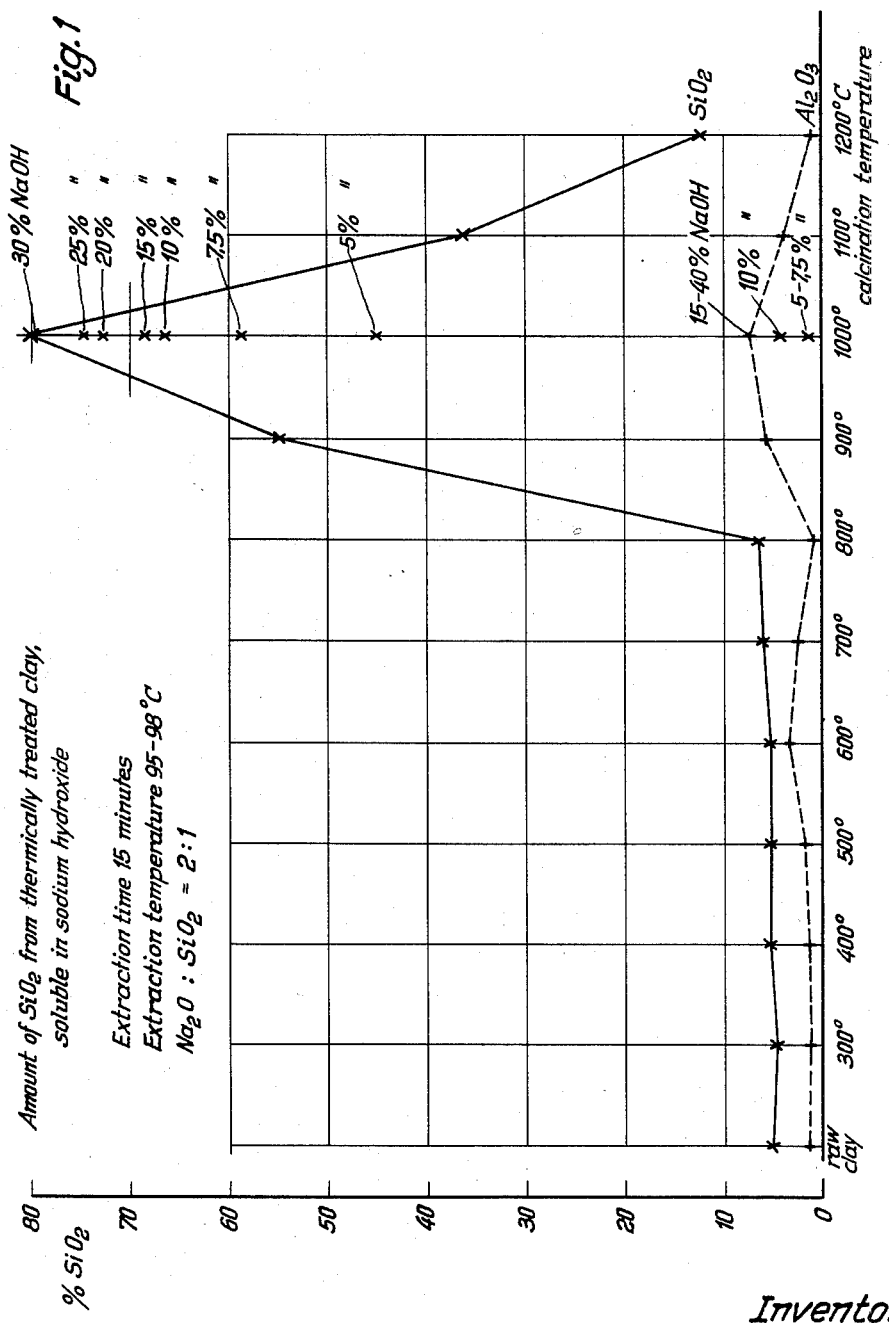

At temperatures below 1000° C. and in particular 900° C. the conversion of $SiO_2$ is incomplete, as will be seen from the graph of Figure 1.

It is also clear from this graph that, when calcining the clays suitable as starting materials according to the invention, the upper temperature limit is also critical, and that already at about 1100° C. and still more at higher temperatures, the conversion rate of the $SiO_2$ content to the soluble form decreases rapidly.

Our above-mentioned discovery that this conversion, when taking place at 1000° C. is already complete after about one hour, is of great economical importance. Furthermore, if the time of calcination should be excessively prolonged, this would also lead to a decrease in the amount of silicic acid converted to soluble $SiO_2$.

Subsequent to calcination, the calcined clay material is then subjected to the second step (II) of the method according to the invention, which step consists in extracting the calcined material after an easily achieved disintegration, with an aqueous sodium hydroxide solution containing between 20 and 35 to 40, and preferably about 30% NaOH.

Figure 2:
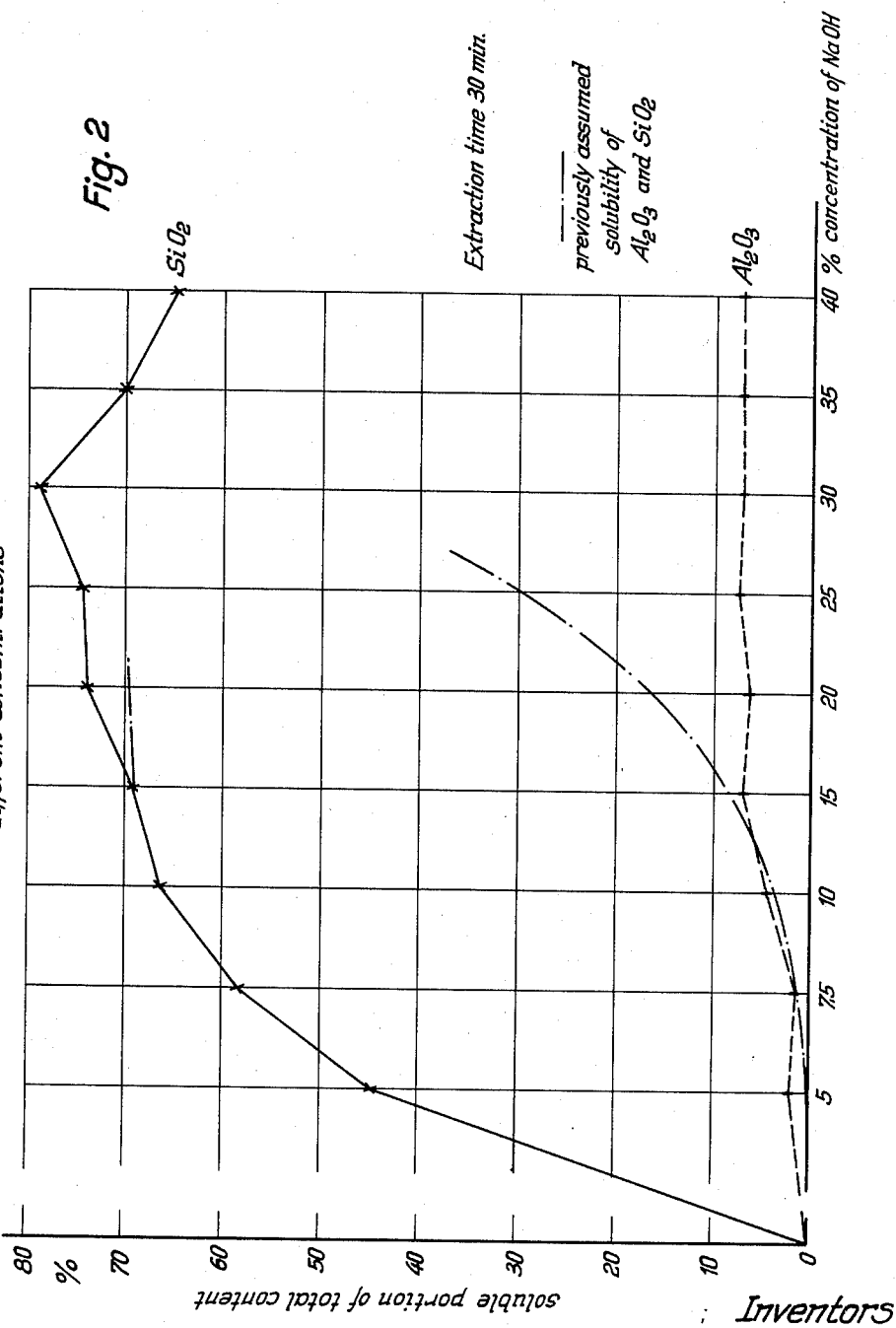
Figure 2 is a graph showing the solubility rate of the $SiO_2$ and $Al_2O_3$ of a clay having a $SiO_2$ content higher than 40% and calcined at about 1000° C. as a function of the NaOH concentration of the extraction agent.

Figure 2 illustrates this step of the method, and shows in particular that, in accordance with our discovery, the solubility of the alumina in the calcined material remains surprisingly enough rather constant and below about 8% and appears to be independent of changes in the concentration of the extracting agent above an NaOH-content of 15% after an initial doubling of the alumina solubility rate with an increase of the NaOH content in the extraction agent from 7.5 to 15%. Figure 2 further illustrates our discovery that a maximum removal of soluble $SiO_2$ from the calcined clay can be achieved with a sodium hydroxide solution containing about 30% of NaOH. In order to achieve these results, the sodium hydroxide solution should have a temperature between about 70° C. and its boiling temperature, preferably about 100° C., and the time of extraction should be limited to about 15 to 30 minutes.

It is essential in carrying out this step of the method invented by us, that the time of treatment of the clays having a high silicic acid content should only be very short and as a rule within the above stated time limits, since we found that in this manner it is possible to dissolve the maximum possible amount of silicic acid, but only a small amount of alumina. We have found that the extraction of silicic acid takes place at a greater speed than that of alumina and is practically complete, if carried out with the sodium hydroxide solution of the above mentioned optimal concentration and within the specified time limit, while only a small amount of alumina not exceeding 8% may become dissolved.

The improved process according to the invention thus overcomes the objections raised by those versed in the art to the use of higher concentrations of caustic soda solution for the removal of silicic acid from clay having a high silicic acid content.

As the next following step (III) in the method according to the invention, the extracted calcinate product is then separated by filtration in a conventional manner from the sodium-silicate containing extraction lye.

Figure 5:
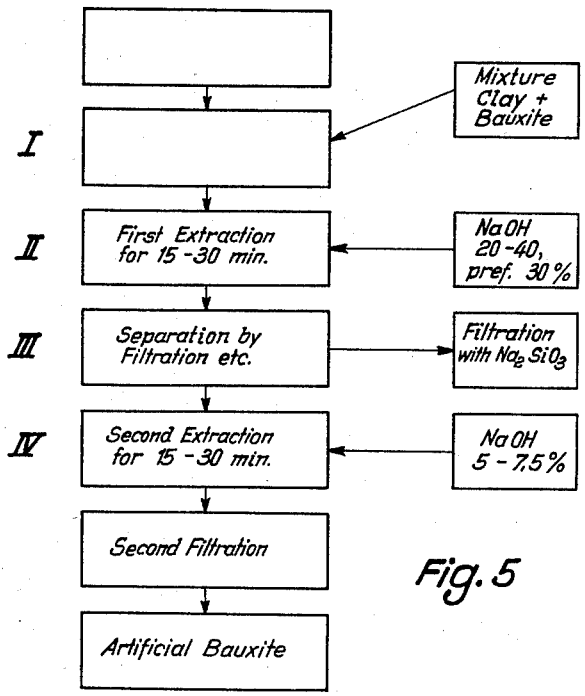
Figure 5 is a flowsheet illustrating another mode of carrying out the method according to the invention.

According to a preferred mode of operation illustrated in the flowsheet of Figure 5, the extracted and filtered calcinate residue is subjected to a second extraction and washing step (IV) with a more dilute aqueous sodium hydroxide solution having a concentration not exceeding 10% and preferably between 5 and 7.5% of NaOH under the same conditions of temperature and time as the first extraction step. No excess pressures are required throughout the process.

By the various process steps described hereinbefore, it is possible to remove 80 to 85% of the initial $SiO_2$ contents from clays having a high silicic acid content above 40%, while normally less than 8% and maximally 10 to 15% of the alumina initially contained in the clays, is dissolved.

The amounts of alkali metal hydroxide (caustic soda, or caustic potash, although the use of the latter will hardly ever be practical for economic reasons) needed for the two extraction stages are about 0.5 to 2.0 moles of $Na_2O$ for each mole of $SiO_2$; a molar ratio of about 1:1 is preferred. However, a higher rate of alkali would be excessive and reduce the economy of the process.

A further feature of the invention consists in treating the lye having a high sodium silicate content and produced in the first, or the first and second extraction step of the process, and then separated by the filtration step or steps, with lime and/or magnesia or their hydrates, thereby freeing the lye from silica and re-caustifying it, whereupon the lye may be recycled to the extraction steps.

The final product may be termed an "artificial bauxite" for it contains an $SiO_2$ content of 15 to 20% and even less, while its alumina content exceeds 65%.

Figure 3:
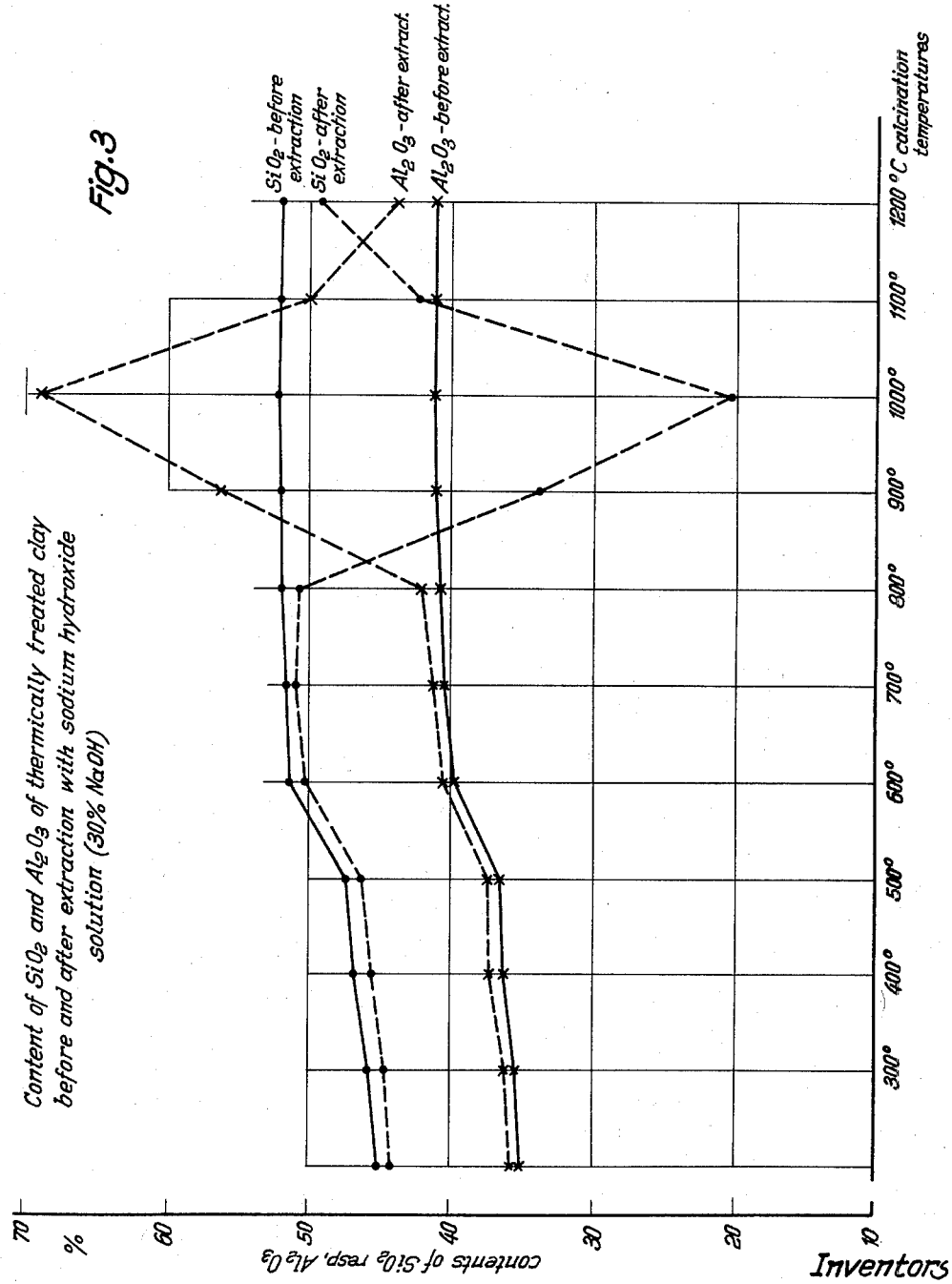
Figure 3 illustrates in a graph the proportions of the $SiO_2$ and $Al_2O_3$ contents of a clay having an $SiO_2$ content above 40%, before and after calcination at different temperatures and subsequent extraction according to the process of the invention.

Figure 3 shows a graph illustrating the conversion of a clay having an initial $SiO_2$ content of about 45% and an initial $Al_2O_3$ content of about 35% to an "artificial bauxite" having an $SiO_2$ content of about 20% and an $Al_2O_3$ content of 69%.

All percentages in this application are given by weight. Correspondingly, the increase in the percentages of both $SiO_2$ and $Al_2O_3$ during the calcination step are due to the loss of water from clay, and at the higher temperatures also due to evaporation of other impurities ($CO_2$ from carbonates etc.).

The content of $SiO_2$ in the artifical bauxite can be further reduced when using as a starting material mixtures of clays and bauxites.

The invention will be further illustrated by a number of examples given below which are, however, not meant to be limitative in any way.

EXAMPLE I

A clay containing 53.6% of $SiO_2$ and 43.0% of $Al_2O_3$ is heated to 1000° C. for one hour, and then extracted for 15 minutes at about 100° C. with NaOH of 30% strength under stirring or pump circulation. The resulting sodium silicate solution is filtered off. The residue obtained contains 27.0% of $SiO_2$ and 65% of $Al_2O_3$. When this residue is after-washed under the same conditions with NaOH of 7.5% strength, a product is obtained which contains 19.9% of $SiO_2$ and 70.5% of $Al_2O_3$

EXAMPLE II

A clay containing 51.2% of $SiO_2$ and 43.7% of $Al_2O_3$ is treated in the manner described in Example I, thus producing a first residue containing 28.8% of $SiO_2$ and 65.1% of $Al_2O_3$, and after the second treatment a product containing 19.6% of $SiO_2$ and 69.6% of $Al_2O_3$.

EXAMPLE III

With another clay, containing 51.3% of $SiO_2$ and 43.7% of $Al_2O_3$, a first residue containing 20.6% of $SiO_2$ and 70.5% of $Al_2O_3$ was obtained, while the final product contained 17.3% of $SiO_2$ and 72.2% of $Al_2O_3$.

The following tables will show the results obtained by a series of further examples made according to the method of the invention, and by repeating Example I with different materials.

*Table I*

| Example No. | Clays | Starting Material | | Final Product | |
|---|---|---|---|---|---|
| | | Percent $SiO_2$ | Percent $Al_2O_3$ | Percent $SiO_2$ | Percent $Al_2O_3$ |
| 4 | Kaolinite | 53.89 | 41.70 | 16.70 | 72.90 |
| 5 | do | 53.60 | 43.00 | 17.30 | 78.50 |
| 6 | Fire-clay | 52.10 | 40.00 | 15.30 | 68.68 |
| 7 | Halloysite | 45.30 | 35.40 | 12.10 | 53.80 |
| 8 | do | 44.90 | 37.20 | 13.20 | 55.80 |
| 9 | Kaolinite | 42.40 | 36.50 | 8.00 | 54.80 |

A further series of examples were carried out with mixtures in varying ratios of a clay containing 53.80 $SiO_2$ and 41.70 $Al_2O_3$ and a bauxite containing 21.20 $SiO_2$ and 51.20 $Al_2O_3$.

*Table II*

MIXTURES OF ABOVE CLAY AND BAUXITE

| Example No. | Starting Material | | Final Product | |
|---|---|---|---|---|
| | Percent Clay | Percent Bauxite | Percent $SiO_2$ | Percent $Al_2O_3$ |
| 10 | 90 | 10 | 18.54 | 61.18 |
| 11 | 75 | 25 | 15.48 | 58.33 |
| 12 | 60 | 40 | 12.81 | 58.25 |
| 13 | 50 | 50 | 10.95 | 61.30 |
| 14 | 25 | 75 | 8.04 | 60.85 |

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What is claimed is:

1. A method for reducing the silica contents of alumina-containing materials and simultaneously increasing the content of alumina, comprising (a) calcining an alumina-containing starting material selected from the group consisting of kaolinites, pyrophyllites and montmorillonites, having $SiO_2$ contents of at least about 40% by weight, at a temperature of about 900 to 1100° C. for about one hour, so as to convert a major portion of the $SiO_2$ present therein into silicate soluble in sodium hydroxide solutions containing about 20% by weight of NaOH, while less than about 10% of the alumina contained therein have become soluble even in strong alkaline solutions, thereafter (b) dissolving said soluble silicate from the calcined material with a sodium hydroxide solution containing above 20% of sodium hydroxide at a temperature of between 70° C. and the boiling temperature of the said solutions, and for a period of about fifteen to thirty minutes, and then (c) separating the silicate-containing solution from the undissolved residue containing the aforesaid increased rate of alumina and the reduced rate of silica.

2. A method as described in claim 1, characterized in that a mixture of a clay selected from the group consisting of kaolinites, pyrophyllites and montmorillonites, having $SiO_2$ contents of at least about 40% by weight, having a high $SiO_2$ content of at least about 40% and a bauxite having an $SiO_2$ content above 10% by weight, is used as the alumina-containing starting material.

3. A method of reducing the silica contents of alumina-containing materials and simultaneously increasing the content of alumina, comprising (a) calcining an alumina-containing starting material selected from the group consisting of kaolinites, pyrophyllites and montmorillonites, having $SiO_2$ contents of at least about 40% by weight, at a temperature of about 900 to 1100° C. for about one hour, so as to convert a major portion of the $SiO_2$ present therein into silicate soluble in sodium hydroxide solutions containing above 20% by weight of NaOH, while less than about 10% of the alumina contained therein have become soluble even in strong alkaline solutions, thereafter (b) dissolving the major portion of said soluble silicate from the calcined material with a sodium hydroxide solution containing above 20% of sodium hydroxide at a temperature of between 70° C. and the boiling temperature of the said solutions, and for a period of about fifteen to thirty minutes, then (c) separating the silicate-containing solution from the undissolved residue containing the aforesaid increased rate of alumina and the reduced rate of silica, and (d) dissolving the portion of soluble silicate still retained in the separated residue by leaching out the latter with a sodium hydroxide solution containing from 2 to 10% of sodium hydroxide.

4. A method for reducing the silica contents of alumina-containing materials and simultaneously increasing the content of alumina, comprising (I) calcining an alumina-containing starting material selected from the group consisting of kaolinites, pyrophyllites and montmorillonites, having $SiO_2$ contents of at least about 40% by weight, at a temperature of about 900 to 1100° C. for about one hour, so as to convert a major part of the $SiO_2$ present therein into silicate soluble in sodium hydroxide solutions containing above 20% by weight of NaOH, while less than about 10% of the alumina contained therein have become soluble even in strong alkaline solutions, thereafter (II) dissolving said soluble silicate from the calcined material with a sodium hydroxide solution containing above 20% of sodium hydroxide at a temperature of about 70° C. and for a period of about fifteen to thirty minutes, then (III) separating the silicate-containing solution from the undissolved residue containing the aforesaid increased rate of alumina and the reduced rate of silica, and (IV) treating the separated silicate-containing solution with an alkali earth metal oxide hydrate so as to precipitate $SiO_2$ therefrom, and recycling the resulting caustic solution into stage (II).

5. A method for reducing the silica contents of alumina-containing materials and simultaneously increasing the content of alumina therein, comprising (a) calcining an alumina-containing starting material selected from the group consisting of kaolinites, pyrophyllites, and montmorillonites, having $SiO_2$ contents of at least about 40% by weight, at a temperature of about 1000° C., for about one hour thereby converting about at least 70% of the $SiO_2$ present therein into silicate soluble in sodium hydroxide solutions containing about 30% by weight of NaOH, while less than about 10% of the alumina contained therein are made soluble in sodium hydroxide solutions, thereafter (b) dissolving said soluble silicate from the calcined material with a sodium hydroxide solution containing about 30% of sodium hydroxide at a temperature of between 70° C. and the boiling temperature of the said solutions, and for a period of about fifteen to thirty minutes, and then (c) separating the silicate-containing solution from the undissolved residue containing an increased rate of about at least 90% of the alumina and a reduced rate of less than 30% of the silica present in the aforesaid starting material.

References Cited in the file of this patent

UNITED STATES PATENTS 1,971,354    Scheidt et al. _____ Aug. 28, 1934

FOREIGN PATENTS 552,583    Great Britain _____ Apr. 15, 1943

OTHER REFERENCES

U.S. Bureau of Mines Publication, R.I. 4132, November 1947, "Recovery . . . Process," by Brown, R. A. et al., pages 6, 12, 13, 20, 61.